United States Patent Office.

GEORGE EDWARD HOPKINS, OF HARWICH, MASSACHUSETTS.

Letters Patent No. 94,495, dated September 7, 1869.

IMPROVED PLASTIC CEMENT.

The Schedule referred to in these Letters Patent and making part of the same.

*To all whom it may concern:*

Be it known that I, GEORGE EDWARD HOPKINS, of Harwich, in the county of Barnstable, and State of Massachusetts, have invented a new and useful Improvement in Plastic Cement; and I do hereby declare that the following is a full and exact description of the mode of making and using the same.

My improvement relates to a new compound or composition of matter intended to be used for covering roofs of buildings, sidewalks, cisterns, and vats; also, for the protection of the hulls of vessels from fouling either by the attachment of marine plants or animals.

This cement or composition is made and also applied without the use of any artificial heat, and when used upon roofs the surface does not require the protection of pebbles or small stones that are now commonly used to cover a surface of boiled coal tar.

I will first state the ingredients used and the proportion of each that is required.

Coal-tar, forty parts.
Sand, or other silicious earth, fifty parts.
Quick-lime, five parts.
Wilmington tar, three parts.
Common salt, one part.
Sulphate of zinc, one-half part.
Caustic soda, one-half part.

These proportions may be slightly varied according to the quality of the coal-tar.

The coal-tar is first placed in a suitable vessel or cistern and the quick-lime is added to it. This, when well mixed, raises the temperature to about 120° Fahrenheit. The sulphate of zinc, in powder, and the Wilmington tar are then put in, which cause the mixture to begin to thicken. The caustic soda is now to be added and well stirred in. Then mix the sand gradually, with the other ingredients, and when all are well combined add the salt.

The compound thus formed should stand about two days, and is then ready for use.

The heat generated when the lime is added promotes the union and mixture of the ingredients and renders artificial heat unnecessary. The lime I prefer to use is that made from oyster-shells.

When cold this composition will not crack, neither will it melt or run down in the sunshine. It is flexible, perfectly water-proof, and can be used for covering the steepest roofs.

The composition or cement is to be used cold. It is applied with a brush upon the sheathing or boards, and hardens after a short exposure.

A coat of coarse, dry sand is to be applied to the surface of the cement, by a blowing-machine, or it may be distributed uniformly with a broom or brush.

When the weather is cold, the cement should be slightly warmed, so that it may flow freely from the brush.

The sulphate of zinc is used to harden the cement and prevent it from flowing or running down. It is therefore desirable to use a little more of this substance, (say about one part in one hundred,) when the compound is used upon the walls or sides of buildings.

What I claim, and desire to secure by Letters Patent, is—

The cement or compound formed by the combination of the several ingredients herein specified, substantially in the manner and for purpose herein described.

Witnesses:    GEORGE E. HOPKINS. [L. S]
    FRANKLIN HUNT,
    JOHN M. BATCHELDER.